US008384682B2

(12) United States Patent
Hu et al.

(10) Patent No.: US 8,384,682 B2
(45) Date of Patent: Feb. 26, 2013

(54) OPTICAL INTERACTIVE PANEL AND DISPLAY SYSTEM WITH OPTICAL INTERACTIVE PANEL

(75) Inventors: Hung-Lieh Hu, Hsinchu County (TW); Chun-Hsing Lee, Hsinchu (TW); Jen-Hao Yeh, Taipei (TW); Sheng-Ho Huang, Kaohsiung County (TW); Yuan-Ching Chen, Kaohsiung County (TW); Yu-Ming Huang, Tainan County (TW)

(73) Assignee: Industrial Technology Research Institute, Hsinchu (TW)

( * ) Notice: Subject to any disclaimer, the term of this patent is extended or adjusted under 35 U.S.C. 154(b) by 480 days.

(21) Appl. No.: 12/649,357

(22) Filed: Dec. 30, 2009

(65) Prior Publication Data

US 2010/0171717 A1 Jul. 8, 2010

Related U.S. Application Data

(60) Provisional application No. 61/143,160, filed on Jan. 8, 2009.

(51) Int. Cl.
*G06F 3/41* (2006.01)
(52) U.S. Cl. ........................ 345/173; 345/178
(58) Field of Classification Search ............... 345/55, 345/60, 156–179, 418, 629; 385/120, 129, 385/130, 147, 224, 11–15, 37; 348/804, 348/E5.103, E5.137; 353/37, 38; 250/227.11, 250/494.1, 239
See application file for complete search history.

(56) References Cited

U.S. PATENT DOCUMENTS

| | | | |
|---|---|---|---|
| 5,122,656 A | | 6/1992 | Williams et al. |
| 5,335,300 A * | | 8/1994 | Hartman et al. ................ 385/37 |
| 5,544,268 A * | | 8/1996 | Bischel et al. .................... 385/4 |
| 5,659,332 A | | 8/1997 | Ishii et al. |
| 5,914,709 A * | | 6/1999 | Graham et al. ............... 345/179 |
| 6,351,260 B1 * | | 2/2002 | Graham et al. ............... 345/179 |
| 6,414,672 B2 | | 7/2002 | Rekimoto et al. |
| 6,466,707 B1 * | | 10/2002 | Dawes et al. ..................... 385/14 |
| 6,522,794 B1 * | | 2/2003 | Bischel et al. .................... 385/4 |
| 6,619,282 B1 * | | 9/2003 | Murtha ......................... 126/636 |
| 6,685,792 B2 * | | 2/2004 | Veligdan et al. ............. 156/256 |
| 6,832,037 B2 * | | 12/2004 | Aylward et al. ............... 385/145 |
| 6,836,613 B2 * | | 12/2004 | DeSanto et al. .............. 385/129 |
| 7,025,461 B2 * | | 4/2006 | Veligdan et al. ................ 353/37 |
| 7,062,134 B2 * | | 6/2006 | Veligdan et al. ............. 385/120 |
| 7,166,966 B2 | | 1/2007 | Naugler, Jr. et al. |
| 7,329,887 B2 * | | 2/2008 | Henson et al. ............. 250/494.1 |
| 7,352,940 B2 * | | 4/2008 | Charters et al. ............... 385/129 |
| 8,274,040 B2 * | | 9/2012 | Zhong et al. .................. 250/239 |

(Continued)

*Primary Examiner* — Prabodh M Dharia
(74) *Attorney, Agent, or Firm* — Jianq Chyun IP Office

(57) ABSTRACT

An optical interactive panel includes a cladding layer, a first waveguide array, a second waveguide array, a first set of image sensor, and a second set of image sensor. The cladding layer has a first index of refraction. The first waveguide array has first waveguide channels formed on the cladding layer, wherein the first waveguide channels have a second index of refraction less than the first index of refraction, and extending at a first direction. The second waveguide array has second waveguide channels, formed on the cladding layer and extending at a second direction. The first set of image sensor detects a first set of light signals from the first waveguide channels to determine a first-direction location. The second set of image sensor detects a second set of light signals from the second waveguide channels to determine a second-direction location.

14 Claims, 15 Drawing Sheets

U.S. PATENT DOCUMENTS

| | | | |
|---|---|---|---|
| 2002/0088930 A1* | 7/2002 | Graham et al. | 250/227.11 |
| 2003/0136897 A1 | 7/2003 | Rabkin | |
| 2004/0017355 A1* | 1/2004 | Shim | 345/157 |
| 2004/0127134 A1* | 7/2004 | DeSanto et al. | 445/23 |
| 2004/0216993 A1* | 11/2004 | Sandhu | 204/192.12 |
| 2005/0047738 A1* | 3/2005 | Veligdan et al. | 385/120 |
| 2005/0201715 A1* | 9/2005 | Ellwood, Jr. | 385/147 |
| 2006/0227120 A1* | 10/2006 | Eikman | 345/175 |
| 2007/0154133 A1 | 7/2007 | Graham | |
| 2007/0296920 A1* | 12/2007 | Mezouari et al. | 353/7 |
| 2008/0039202 A1 | 2/2008 | Sawano et al. | |
| 2009/0103853 A1* | 4/2009 | Daniel | 385/13 |
| 2009/0155832 A1* | 6/2009 | Lo et al. | 435/29 |
| 2009/0237375 A1* | 9/2009 | Khan et al. | 345/175 |
| 2009/0322706 A1* | 12/2009 | Austin | 345/175 |
| 2011/0116735 A1* | 5/2011 | Baets et al. | 385/12 |

\* cited by examiner

OPTICAL INTERACTIVE PANEL AND DISPLAY SYSTEM WITH OPTICAL INTERACTIVE PANEL

CROSS-REFERENCE TO RELATED APPLICATION

This application claims the priority benefit of U.S. provisional application Ser. No. 61/143,160, filed on Jan. 8, 2009. The entirety of the above-mentioned patent application is hereby incorporated by reference herein and made a part of this specification.

BACKGROUND OF THE INVENTION

1. Technical Field

The present disclosure relates to an optical interactive panel. More particularly, the present disclosure relates to a technology of optical interactive panel, which can be implemented on an image display system.

2. Background

Conventionally, a user to control or communicate with the computer system is mainly based on a keyboard or a mouse. However, as technologies advance, the interface between a user and an electronic system is intended to be more convenient. For example, Wii designed by Nintendo and iPhone by Apple are user-friendly in the way of inputting commands and generating the corresponding feedbacks.

In various interfaces, a touch panel is one of the interfaces to allow relatively easier communication between a machine and a user. Touch panels have several sensing mechanisms. However, a conventional touch panel is not easy to be assembled in a large display device. Particularly, when the display screen is as large as 150 inches, the wide input area is too far for a user to reach, since a user needs to physically contact the panel to input commands. Further, the cost to implement the large touch panel is still high.

SUMMARY

According to one embodiment, an optical interactive panel can for example, receive a light spot from an invisible light pointer and display the location of the light spot by the display panel.

According to another embodiment, an optical interactive panel includes a cladding layer, a first waveguide array, a second waveguide array, a first set of image sensor, and a second set of image sensor. The cladding layer has a first index of refraction. The first waveguide array has first waveguide channels formed on the cladding layer, wherein the first waveguide channels have a second index of refraction greater than the first index of refraction, and are extending at a first direction. The second waveguide array has second waveguide channels, formed on the cladding layer and are extending at a second direction. The first set of image sensor detects a first set of light signals from the first waveguide channels to determine a first-direction location. The second set of image sensor detects a second set of light signals from the second waveguide channels to determine a second-direction location.

According to another embodiment, an optical interactive apparatus is formed by a plurality of the foregoing optical interactive panels, assembled together side by side as a light spot sensing panel.

According to another embodiment, a display system includes an image display; and an optical interactive panel. The optical interactive panel is formed on a screen of the image display to detect a relative location of a light spot on the screen. The image display receives the relative location of a light spot and responds a corresponding action. The optical interactive panel includes a cladding layer, a first waveguide array, a second waveguide array, a first set of image sensor, and a second set of image sensor. The cladding layer has a first index of refraction. The first waveguide array has first waveguide channels formed on the cladding layer, wherein the first waveguide channels have a second index of refraction greater than the first index of refraction, and are extending at a first direction. The second waveguide array has second waveguide channels formed on the cladding layer and is extending at a second direction. The first set of image sensor detects a first set of light signals from the first waveguide channels to determine a first-direction location of the relative location. The second set of image sensor detects a second set of light signals from the second waveguide channels to determine a second-direction location of the relative location.

It is to be understood that both the foregoing general description and the following detailed description are exemplary, and are intended to provide further explanation of the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION

In the disclosure, an optical interactive panel is proposed and can be in a large operation area and can be assembled in a display system. Several embodiments are provided for illustration of the disclosure. The present disclosure is not just limited to the provided embodiments and the embodiments can be combined one another.

Figure 1:
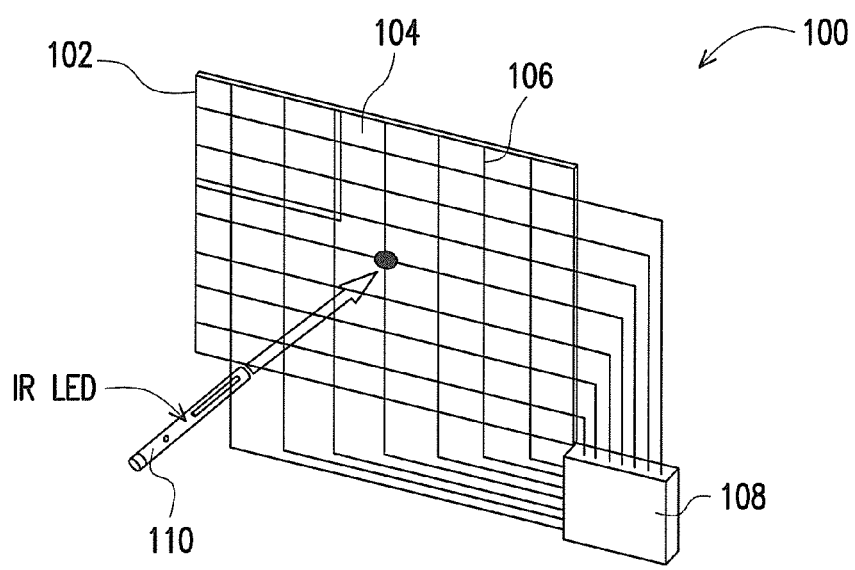
FIG. 1 is drawing, schematically illustrating an optical interactive panel system, according to an embodiment of the disclosure.

FIG. 1 is drawing, schematically illustrating an optical interactive system, according to an embodiment of the disclosure. In FIG. 1, the IR light source is used as the inputting device 110. The IR light source can be easily produced by the IR LED or LD 110, for example. The IR ray is invisible to human eyes and physically projected on the screen of a display. Other invisible radiation sources, such as ultraviolet ray or deep ultra-violet ray, can also be used as the light source for inputting signals. Visible lights in accompany with proper arrangements to reduce the interference of ambient lights may be used as the pointing and/or identifying sources, too.

An optical interactive panel 100 is associated with a display 102. The display 102 in FIG. 1 is shown just a portion of area for demonstrating the relation between the display 102 and the optical interactive panel 100. The optical interactive panel 100 is assembled with the display 102, for example, by disposing on the display screen at front, behind, or inside. The optical interactive panel 100 has, for example, a two-direction waveguide arrays 104 formed by several waveguide channels 106. A cladding layer may clad the waveguide channels 106 for protection, as an option. When the IR light from the inputting device 110 projects on the waveguide array 104 at the corresponding waveguide channels 106, a portion of the light is coupled into the corresponding waveguide channels 106. The optical sensor 108 detects waveguide channels 106 containing light signals and determines the coordinate of light spot impinging on the optical interactive panel 100. When the position of the light spot is determined, this information is transmitted to the display system. The display system then generates visible indicia on the display screen. In other words, the visible indicia is not produced by the IR light, instead, it is generated and displayed by the display system. The optical interactive panel 100 is then achieved.

Figure 2:
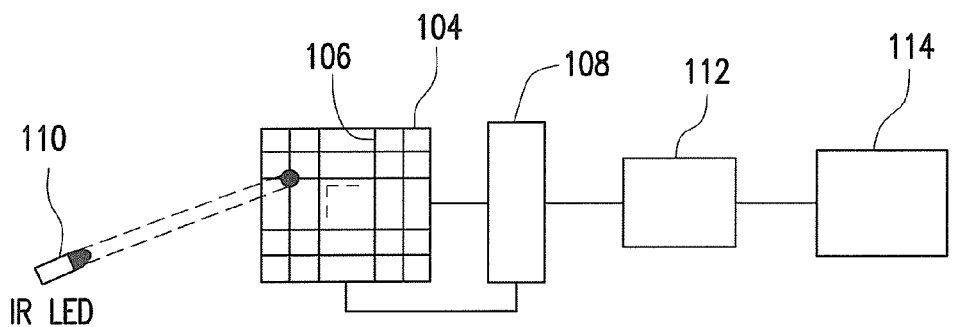
FIG. 2 is a drawing, schematically illustrating schematic block diagram of an optical interactive panel system, according to an embodiment of the disclosure.

FIG. 2 is a drawing illustrating schematic block diagram of an optical interactive panel system, according to an embodiment of the disclosure. In FIG. 2, the waveguide array 104 receives the inputted signals, such as a light spot from the inputting device 110 and the waveguide channels 106 guide and confine a portion of the light signals from the light spot therein. The optical sensor 108 detects light signals in the waveguide channels 106 to determine the coordinate where the light spot is projected. The positional signal corresponding to the coordinate is then generated and outputted to a controller 112. The controller 112 can, for example, control the computer system and/or the display system 114 to generate an indicating image pattern, such as a spot, a cursor, a series of consecutive lines with the same or different colors, or the combination thereof, to be displayed in the display screen (not shown). Since the optical interactive panel 100 is aligned with the display screen, the light spot can be indirectly shown as a visible indicating pattern.

Figure 3:
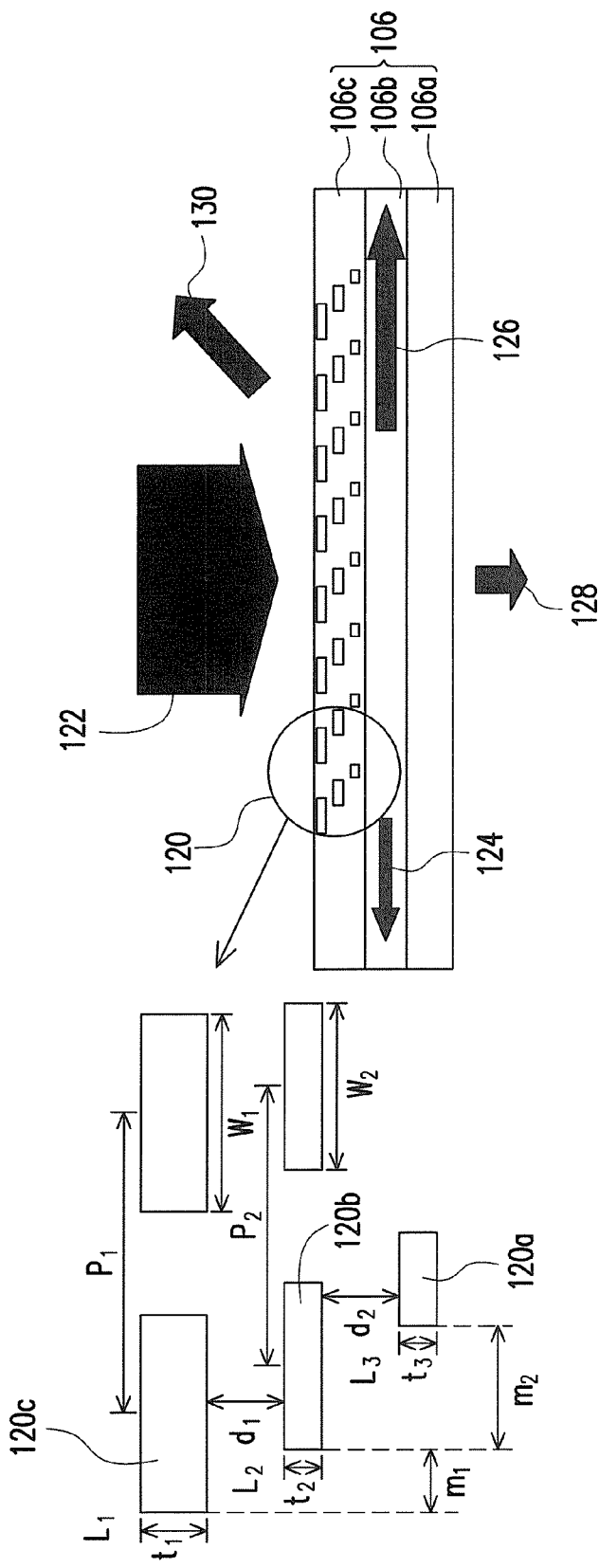
FIG. 3 is a drawing, schematically illustrating a guiding mechanism of a waveguide, according to an embodiment of the present disclosure.

FIG. 3 is a drawing, schematically illustrating a guiding mechanism of a waveguide, according to an embodiment of the present disclosure. In FIG. 3, in order to couple the input light signals of the light spot into the waveguide channels 106 and direct the light signals toward to corresponding optical sensors, each waveguide channel 106 can be a stacked channel layer formed of a lower layer 106a, a middle layer 106b, and an upper layer 106c. The lower layer 106a has an index of refraction of n1, the middle layer 106b has an index of refraction of n2, and the upper layer 106c has a varying index of refraction. The upper layer 106c may be a layer with an index of refraction of n3 as a base, in which n3 is preferably equal to n1. Basically, a portion of the input light signals 122 can be coupled into the middle layer 106b and confined therein due to total internal reflection or any reflection portion, as known by the optical phenomenon. The inner canalizing structure 120 embedded in the upper layer 106c for illustrative purpose, can be, for example, the same material as the middle layer 106b. The inner canalizing structure 120 can be formed of one or a plurality of layers. The enlarged drawing is an example illustrating a three-layer (120a, 120b and 120c) inner canalizing structure, in which L1, L2, L3, and so on are the sequence of the grating layers; t1, t2, t3 and so on are the thickness for each grating layer; d1, d2, d3, and so on are gap between the grating layers; P1, P2, P3, and so on are the grating pitches; W1, W2, W3, and so on are the grating widths; m1, m2, m3, and so on are the lateral shift between the grating layers. These parameters of density, thickness, gap, width, pitch, and lateral shift can be adjusted so as to produce desired optical performance. For illustrative purposes, when the wavelength of light source is 1.55 um wavelength, the pitch P1 and P2 may range between 1~1.1 um, the lateral shift m1 and m2 may range between 0~3 um, the gap d1 and d2 may fall within 0~0.6 um, and the thickness t1, t2 and t3 could be adjusted within 0.05~1.5 um. This arrangement makes the varying index of refraction in the upper layer 106c possible. Furthermore, either one or some of the parameters can be arbitrarily and selectively adjusted so as to achieve the varying index of refraction as well. The above-mentioned embodiment is just an example and does not preclude the alternatives of adjusting one or some of the parameters. Due to the optical phenomenon of diffraction, the wave number vector k can be changed in propagation. Accordingly, at least a portion of the input light 122 is gradually deflected and enters the middle layer 106b to split as light 124 and 126. Each waveguide channel has the upper layer 106c, so that at least a portion of the input light signals 122 impinging on the waveguide arrays can be coupled into the waveguide channels. The light 124 and light 126 are detected by an optical sensor and/or optical sensors disposed at the end of waveguide channels to determine whether a light is impinged thereon. The virtual or physical crosspoint of waveguide channels where light spot impinged gives the coordinate of the light spot. The so-called "physical cross point of waveguide channels" is construed to have waveguides channels of X-axis and Y-axis direction disposed on the same plane and substantially crossed with each other. It is therefore "one-dimension waveguide arrays" with X-axis and Y-axis direction waveguide channels formed on the same plane. In terms of "virtual cross point" of waveguide channels, it is construed that multiple parallel waveguide channels of X-axis direction are disposed on one plane, while multiple parallel waveguide channels of Y-axis direction are disposed on opposing plane or on a different plane. The waveguide channels of X-axis and Y-axis direction are spaced apart and virtually crossed. It is therefore called "two-dimension" waveguide arrays. Generally, crosspoint of waveguide channels determines the coordinate with respect to a plane. The way of forming two-dimension arrays, can be, for example, having another layer of waveguide channels with all the channels extending along Y-axis direction and laminating this layer with layer of waveguide channels in X-axis direction.

Referring to FIG. 3, reflected light 130 and penetrating light 128 other than guided light 124 and 126 may occur. Particularly in the design with two layers of waveguide channels separately extending in X and Y directions, the penetrating light 128 passing the waveguide channels extending along X direction can enter another layer of waveguide channels extending at a different direction, such as Y direction, so that the two layers of waveguide channels give X and Y coordinates. The optical performance of gradually varying index of refraction can be achieved by adjusting either one or some of the parameters of density, thickness, gap, width, pitch, and lateral shift. The structure in FIG. 3 is one of the examples and serves for illustrative purposes only.

Figure 4:
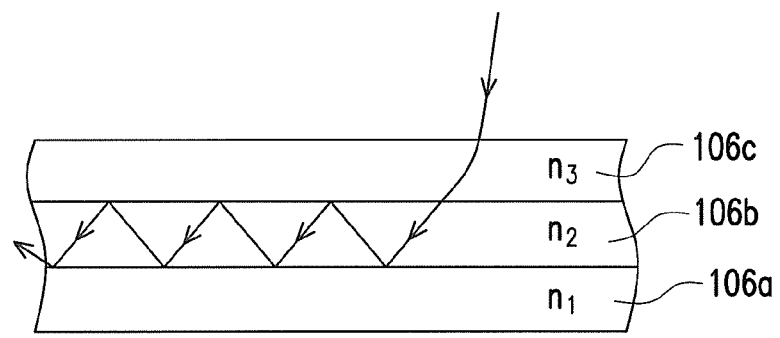
FIG. 4 is a drawing, schematically illustrating how the light is coupled into the waveguide, according to an embodiment of the present disclosure.
Figure 5:
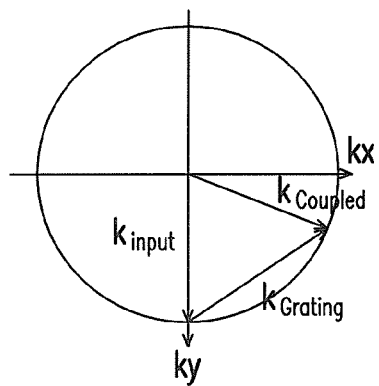
FIG. 5 is a drawing, schematically illustrating the change of the propagation wave vector k.

FIG. 4 is a drawing, schematically illustrating how the light is deflected into the waveguide, according to an embodiment of the present disclosure. In FIG. 4, in general, the light projected on the upper layer 106c of the waveguide channels is deflected and confined in the middle layer 106b. The actual light path is more complicated and is described in detail. As illustrated, the incident light is gradually deflected by the upper layer 106c and then coupled into the middle layer 106b. Due to total internal reflection at the interface between two different indices of refraction, the light then is directed toward the specified direction within the waveguide channels. FIG. 5 is a drawing, schematically illustrating the change of the wave vector k. The light propagation direction is determined by the wave vector k. Due to the effect by the upper layer 106c with the inner canalizing structure 120, the input wave vector $k_{input}$ is changed into the $k_{coupled}$.

Figure 6:
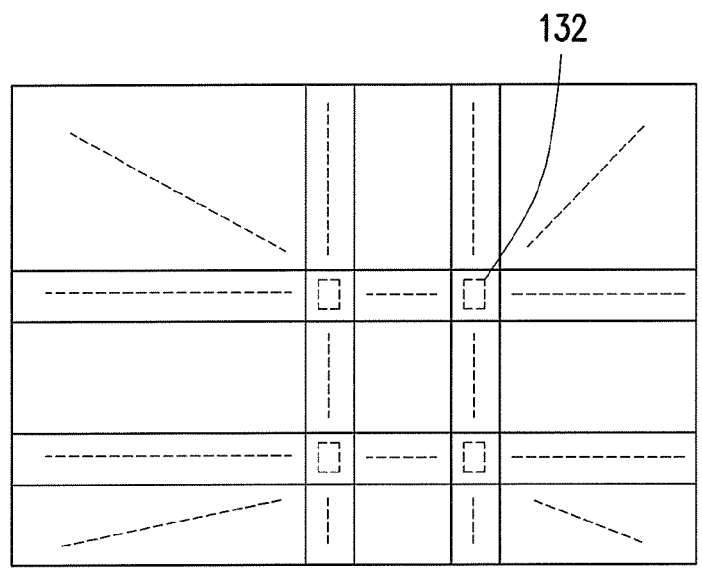
FIG. 6 is a drawing, schematically illustrating the waveguide array of the interactive panel, according to an embodiment of the present disclosure.
Figure 13:
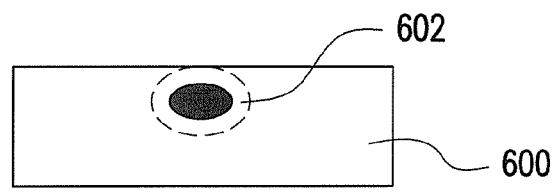
FIG. 13 is a drawing in cross-sectional view, schematically illustrating the structure of waveguide with various materials.

FIG. 6 is a drawing, schematically illustrating the waveguide array of the optical interactive panel 100, according to an embodiment of the present disclosure. In FIG. 6, just a portion of waveguide channels substantially crossing with each other are shown. The waveguide channels at the cross point has the inner canalizing structure 132, which is similar to the inner canalizing structure 120 as shown in FIG. 3. The inner canalizing structure 132 can be formed at the cross point of the waveguide channels 106 so that the incident light can be deflected into two directions. Furthermore, the waveguide channels 106 can be formed on a base layer or in a cladding layer, depending on the actual design. In an example as shown in FIG. 13, the waveguide channels can be formed in a base layer 600 by a conventional process. The inner canalizing structure 132 can, for example, perforin functions of deflecting the light and directing the same to an optical detector or optical detectors. Any structure having the same or similar optical functions can be utilized.

Figure 7:
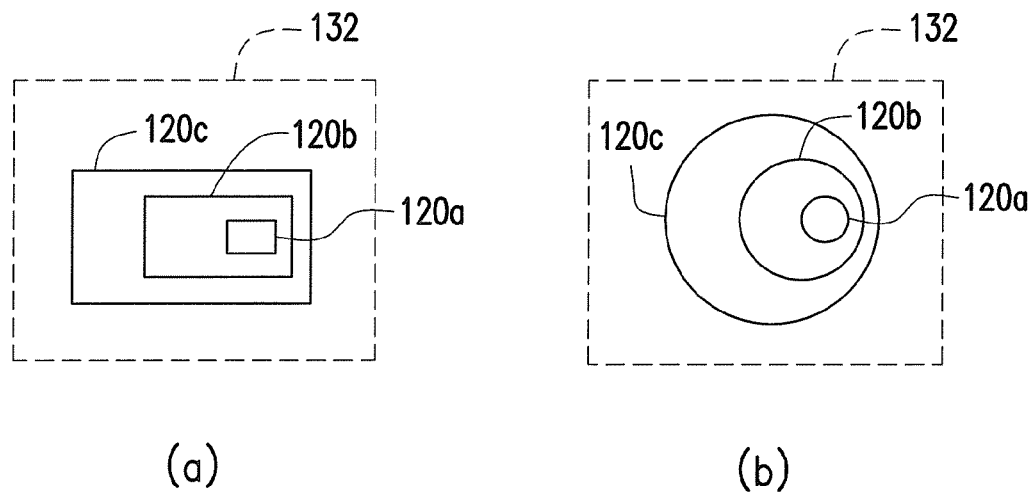
FIG. 7 is a drawing, schematically illustrating the structure of light-deflect pattern of the waveguide, according to an embodiment of the present disclosure.

FIG. 7 is a sectional drawing schematically illustrating the inner canalizing structure 132 according to an embodiment of the present disclosure. As shown in FIG. 7, the inner canalizing structure 132 has three layers 120a, 102b, and 120c, the same structure as shown in FIG. 3. Each inner canalizing structure 132 from top view has three cells in a desired geometry, such as rectangular shape shown in FIG. 7(a) or round shape shown in FIG. 7(b). FIG. 7 showing the sectional views of inner canalizing structure 132 is again for illustrative purposes only and can be changed into any proper geometry according to the actual need and design choice.

Figure 8:
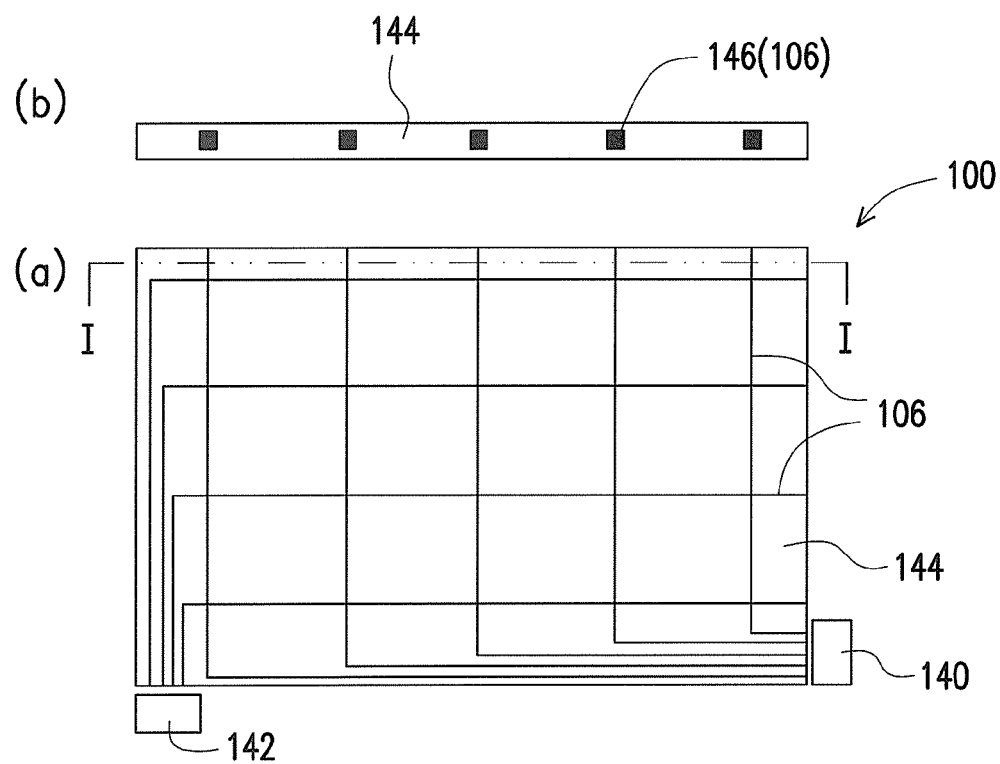
FIG. 8 is a drawing, schematically illustrating an optical interactive panel in two-dimension, according to an embodiment of the present disclosure.

FIG. 8 is a drawing, schematically illustrating an optical interactive panel 100 according to an embodiment of the present disclosure. In FIG. 8(a), the waveguide channels 106 are for example formed in a cladding layer 144. In FIG. 8(b), a cross-sectional view at the line I-I is shown. The core 146 is the waveguide channels 106. The inner canalizing structure 120 in FIG. 3 or the inner canalizing structure 132 in FIGS. 6 and 7, for example, can be formed in the waveguide channels 106, so as to deflect the incident light into the waveguide channels 106. The waveguide channel array can determine the location of the light spot. The optical sensor 140 detects the light signals, in vertical waveguide channels corresponding to X position, and the optical sensor 142 detects the light signals in horizontal waveguide channels corresponding to Y position. Two optical sensors 140 and 142 are used in FIG. 8 in detecting the coordinate in a separate manner. However, the layout of the waveguide channels in either of the vertical direction or horizontal direction could be altered to make all the waveguide channels parallel extend and connect to only one optical sensor so as to reduce the number of optical sensors and save the manufacturing costs.

Figure 9:
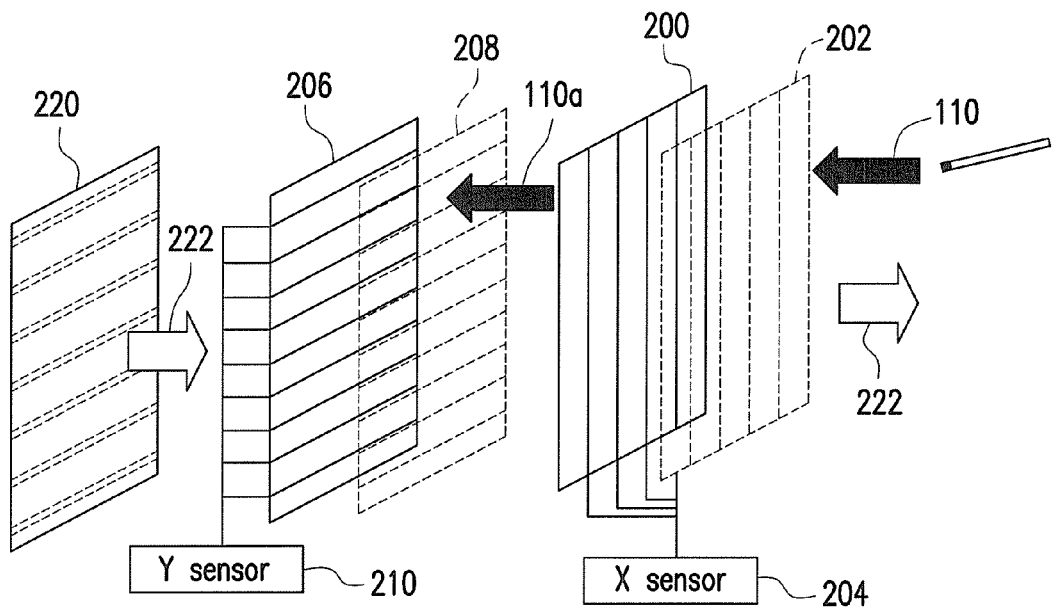
FIG. 9 is a drawing, schematically illustrating an optical interactive panel in two-dimension associating with a display, according to an embodiment of the present disclosure.

FIG. 9 is a drawing, schematically illustrating an optical interactive panel 100 associated with a display 220, according to an embodiment of the present disclosure. In FIG. 9, the optical interactive panel 100 is formed of two sets of the one-dimension arrays. The input light 110, for example, passes the first set of one-dimension arrays for X-axis direction. The set of X-direction waveguide channels 200 is distributed in predetermined X direction and extending along the Y direction. However, in order to deflect the light 110 into the waveguide channels 200, a grating coupler 202, an embodiment of the inner canalizing structure 120 in FIG. 3, can be embedded in the waveguide channels 200. The optical sensor 204 detects the channels containing light signals so as to determine the X position. In some situations, several channels can simultaneously share the projected light. Nevertheless, the actual position of the input light 110 can still be detected by adjusting the threshold of sensitivity of optical sensors. A residual portion of the light 110a leaks out from the set of X-direction waveguide channels 200 and enters the second set of Y-direction waveguide channels 206. Likewise, the grating coupler 208, an embodiment of inner canalizing structure 120 as shown in FIG. 3, can be embedded therein. Then, the optical sensor 210 detects the Y position of the light 110a. Since it still needs the residual light 110a for Y coordinate detection, the inner canalizing structure in the form of grating coupler 202 must allow sufficient portion of the residual light 110a to penetrate through by adjusting the aforementioned parameters. The X sensor 204 and Y sensor 210 feed back the positional information of the light 110 to the displaying system. The display system then generates visible indicia on the display screen 220 corresponding to the light 110. It is noted that the light 110 can be projected on the set of Y-direction waveguide channels 206 first and pass through the X-direction waveguide arrays 202. In other words, the relative position of the two sets of one-dimension arrays can mutually interchange.

Figure 10:
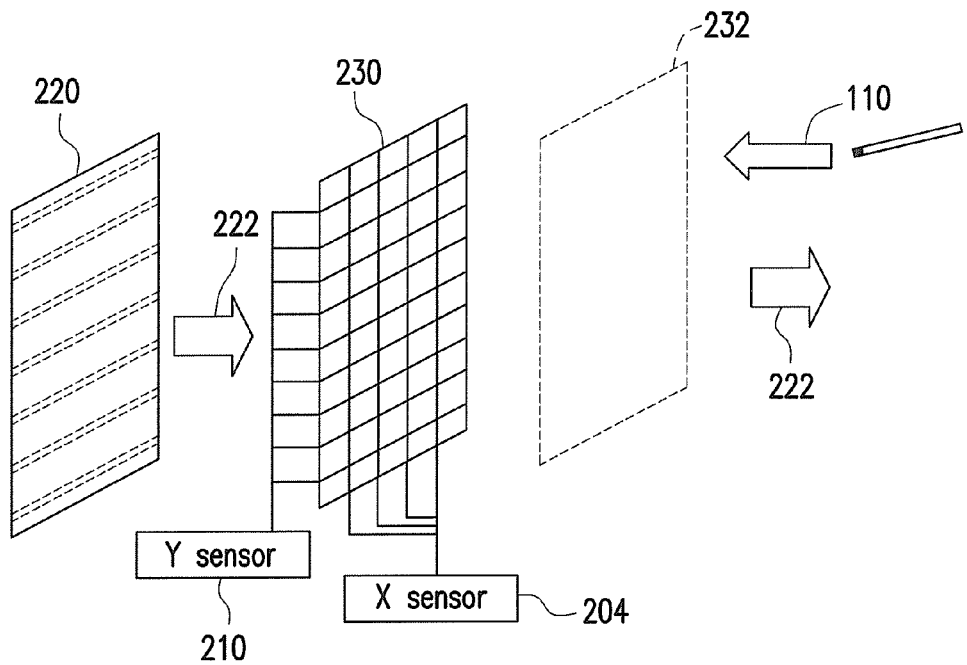
FIG. 10 is a drawing, schematically illustrating an interactive panel in two-dimension associating with a display, according to another embodiment of the present disclosure.

FIG. 10 is a drawing, schematically illustrating an optical interactive panel in two-dimension arrays associated with a display screen 220 according to another embodiment of the present disclosure. In FIG. 10, only one set of waveguide channels 230 is provided. Said waveguide channels 230 are composed of two-dimension waveguide channels 230 extending in two directions and crossing at intersections. As a result, the light 110 can be deflected into the waveguide channels 230 in two directions at the same time. The optical element 232 can be a grating as mentioned previously, or a prism coupler, for example.

Figure 11:
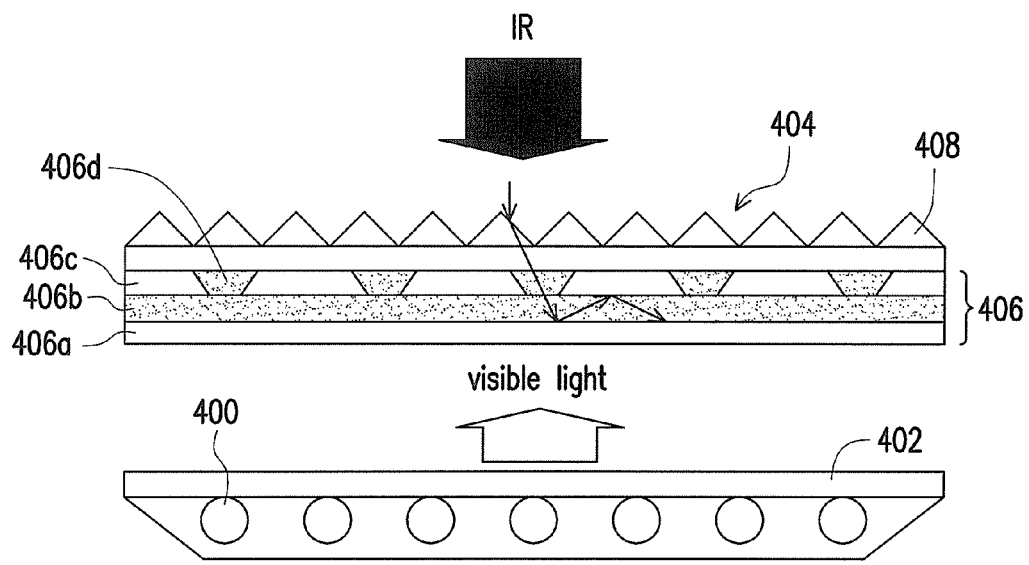
FIG. 11 is a drawing, schematically illustrating a portion of an optical interactive panel, according to another embodiment of the present disclosure.

FIG. 11 is a drawing, schematically illustrating a portion of the optical interactive panel according to another embodiment of the present disclosure. In FIG. 11, the waveguide channels 406 can be formed together with an optical element 404, such as a brightness enhancement film (hereinafter referred to as BEF) 404. A BEF is usually a plate structure formed of multiple prisms 408. The prisms 408 can be formed by the exterior layer of the multi-layered waveguide channels 406. Alternatively, the prism plate can be assembled to the multi-layered waveguide channels 406. The prisms 408 can be micro prisms so that the light can be coupled into the waveguide channels 406. The layer 406c of the waveguide channels 406 may have openings 406d, which allows light to easily enter the layer 406b. The openings 406d can be filled with the same material of the layer 406b. The light enters the prism coupler 404 and produces light signals to be guided into the waveguide channels 406b. Meanwhile, visible light provided from the back light module 400 as a light source for the displaying system is incident in opposite direction to the IR. The diffuser plate 402 causes more uniform planar light for displaying use.

Figure 12:
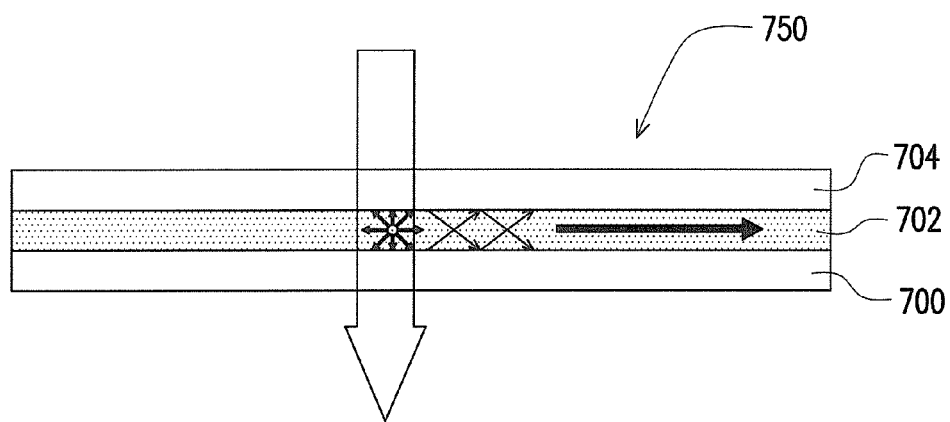
FIG. 12 is a drawing in cross-sectional view, schematically illustrating a waveguide structure according to another embodiment of the present disclosure.

Alternatively, FIG. 12 is a drawing in cross-sectional view, schematically illustrating a waveguide channel 750 according to another embodiment of the present disclosure. In FIG. 12, in a further mechanism to guide the light in the waveguide channels, the waveguide channel 750 can also be in three layers of 700, 702, and 704, for example, in which the middle layer 702 has larger index of refraction than the outer layers 700 and 704 such as the cladding layers, so that the total internal reflection for some larger incident angle can occur. The middle layer 702 is doped with some fluorescent materials. It is possible to place the fluorescent materials in the cladding layers as well. However, the waveguide channel can be fabricated by various manners and it is not just limited to the manner of doping to the middle layer 702. When the light enters the waveguide channel 750, a fluorescent light is excited. A portion of the fluorescent light with larger incident angle at the interface is subject to the total internal reflection. Then, the light signal is canalized to an optical sensor and/or optical sensors. In other words, this waveguide channel is activated by the IR light spot, and the crosspoint where the IR light spot impinges provides the coordinate of the light spot.

The waveguide channel can be formed in various manners with different structures, as can be known by the one with ordinary skill in the art. FIG. 13 is a drawing in cross-sectional view, schematically illustrating structure of a waveguide. In FIG. 13, a base layer 600 can be $LiNbO_3$ and the waveguide channel 602 can be Ti: $LiNbO_3$, formed in the base layer 600 as a diffused waveguide. Actually, the waveguide channel arrays can be organic material, inorganic material or a mix of organic material with inorganic material. The organic material can be, for example, epoxy, acrylic, polyimide, and so on. The process can be, for example, photolithographic process, embossing process, laser ablation or laser writing. The waveguide channel can also be formed on a hard substrate, such as glass or silicon wafer, or a soft substrate. The inorganic material can be, for example, $LiNbO_3$, III-V semiconductor compound, silicon oxide, silicon-on-insulator (SOI), and so on. Basically, the formation of waveguide is conventionally known. However, the present disclosure proposes the waveguide channels with the design to deflect the light into the waveguide channel or activate the light in the waveguide channels by fluorescent-conversion mechanism. As a result, the light spot can transform into light signals in the waveguide channels and the light signals further are directed to the sensor and/or sensors. The location of the light spot is therefore determined.

Figure 14:
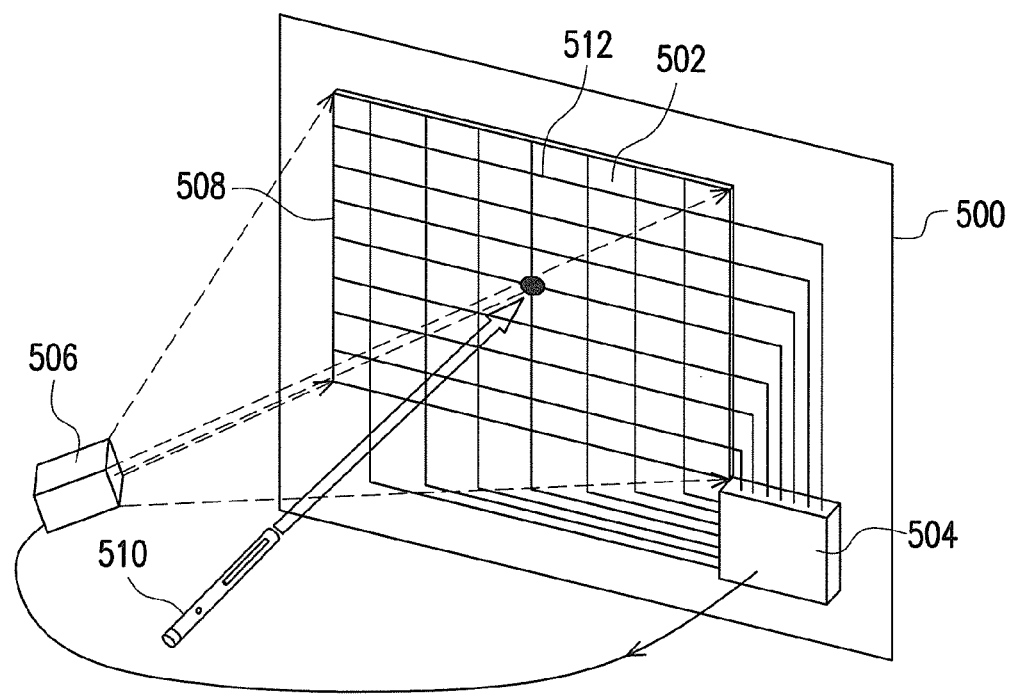
FIG. 14 is a drawing, schematically illustrating an interactive panel used in projector, according to another embodiment of the present disclosure.

FIG. 14 is a drawing, schematically illustrating an optical interactive panel used in combination with a projector, according to another embodiment of the present disclosure. In FIG. 14, the display has several mechanisms. Particularly, the image 340 projector 506 is useful for a large display screen 500. The present disclosure can also be used in the projecting system. The screen 500 is to display the image by the projector 506. The optical interactive panel 508 can be integrated with the screen 500. The optical interactive panel 508, for example, has a base layer 502 or cladding layer 502, on which the waveguide channels 512 are formed thereon. The optical sensor 504 detects the light spot from the IR LED 510 for example. The optical sensor 504 provides the position of the IR light spot to the projector 506. The projector 506 projects the image on the screen 500, in which visible indicia as a part of the displayed image is generated. As a result, the light spot can be seen, and can move according to the movement of beam of the IR light source 510.

The optical interactive panel 508 as show in FIG. 14 is an integral part of the screen. In actual design, the optical interactive panel can be an individual unit and can be easily assembled to a display screen 500. If contact-free input is constantly needed, the optical interactive panel 508 is better to be an integral part of the display screen 500.

The present disclosure in general uses the waveguide channels to canalize at least a portion of the incident light to one or more optical sensors for detecting which one of the waveguide channels has the optical signal induced by the incident light. Based on the geometrical layout of the waveguide channels, the location of the incident light can be determined. In order to canalize the incident light into the waveguide channels, the inner canalizing structure is formed in the waveguide channels, so that at least a portion of the incident light on the waveguide channels can be gradually deflected into the waveguide channels for detection by the corresponding optical sensors. The incident light can preferably be IR light, so that the IR light would not interfere with the visible image in usual display. However, other lights in different wavelength ranges can also be used if it is intended. The waveguide preferably needs to be designed with, for example, proper materials and other design factors for sufficiently adapting the incident light in specific range of frequency.

Based on the aspect of the disclosure, the interactive panels can be form in various structures. FIGS. 15-29 are drawing, schematically illustrating perspective view of interactive panels, according to several embodiments.

Figure 15:
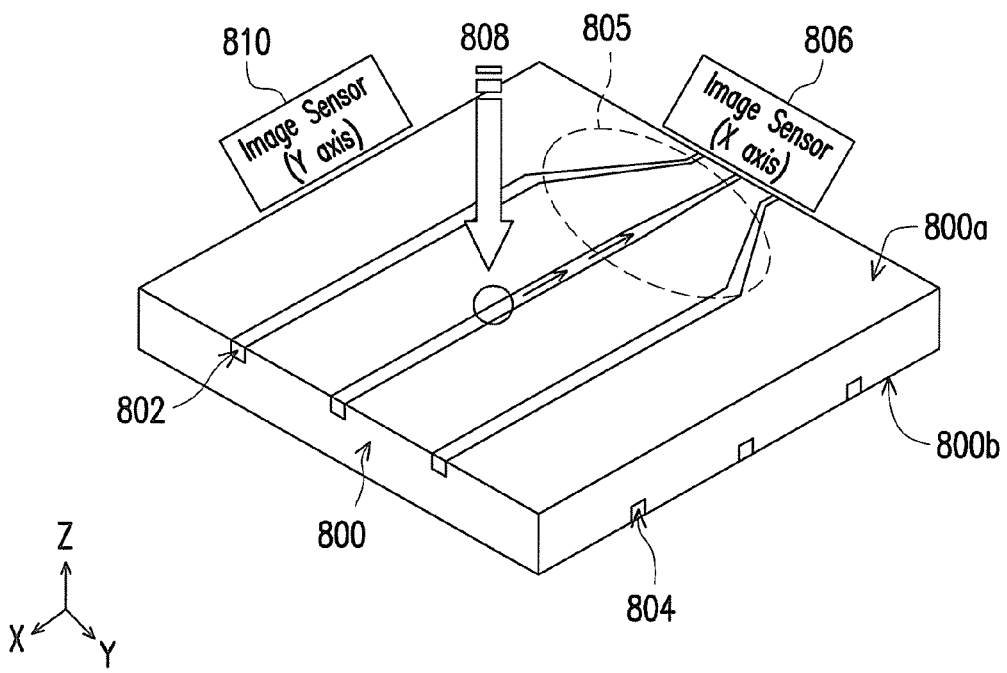
FIGS. 15-29 are drawings, schematically illustrating perspective view of interactive panels, according to several embodiments.

In FIG. 15, an interactive panel in an example includes a cladding layer 800, which is also serving as a transparent substrate, made by a material of relatively low index of refraction (low-n). The cladding layer 800 has two surfaces 800a, 800b. An array of cores 802 is formed in the cladding layer 800 at the surface 800a, extending on the direction of X-axis, for example. The cores 802 are in parallel lines at the specific position and are made of high index of refraction (high-n) relative to the low-n of the cladding layer, so as to have the light guiding function. In other words, the cores 802, 804 in use with the cladding layer 800 for as two waveguide arrays. Each core is functioning as a waveguide channel. In the example, a portion of the core surface is exposed to the air. However, the cores 802, 804 can also be further covered by the other optical material, or fully embedded in the cladding layers 800 without limitation.

Looking from the surface 800a, for example, the end portion 805 of the cores 802 of the waveguide array is in shrunk structure, so as to adapt to the I/O capability of the image sensor 806 at the X-axis direction. The image sensor 806 detects the light signals in the cores 802 at the X-axis direction, so as to determine the Y-coordinate of the light spot from the light source 808. Likewise, another waveguide array of cores 804 is formed in the cladding layer 800 at the surface 800b, extending on the direction of Y-axis, for example. The image sensor 810 is at the end portion to detect the light signals in the cores 804 extending at the Y-axis direction, so as to determine the X-coordinate of the light spot.

It can be understood that the number of the image sensors 806, 810 is not limited to just one but depending on the grouping of the waveguide channels and the capability of the image sensors 806, 810. Further, it may also have the image sensors 806 at the same one side or at two sides in the X-axis, for example. Likewise, it may also have the image sensors 810 at the same one side or at two sides in the Y-axis.

Further for the fabrication about the structure of embedded cores, the cladding layer 800 can be formed the trenches by semiconductor process or any conventional method, and then the cores are filled into the trenches and cured. The structure of cores can be formed any proper conventional manner without specific choice. The available materials for cladding layer can be, for example, organic waveguide material, such as PMMA, glass, UV glue, silica gel, epoxy, or flexible polymer. The core material can be, for example, organic waveguide material, such as UV glue, silica gel, epoxy, or flexible polymer.

Figure 16:
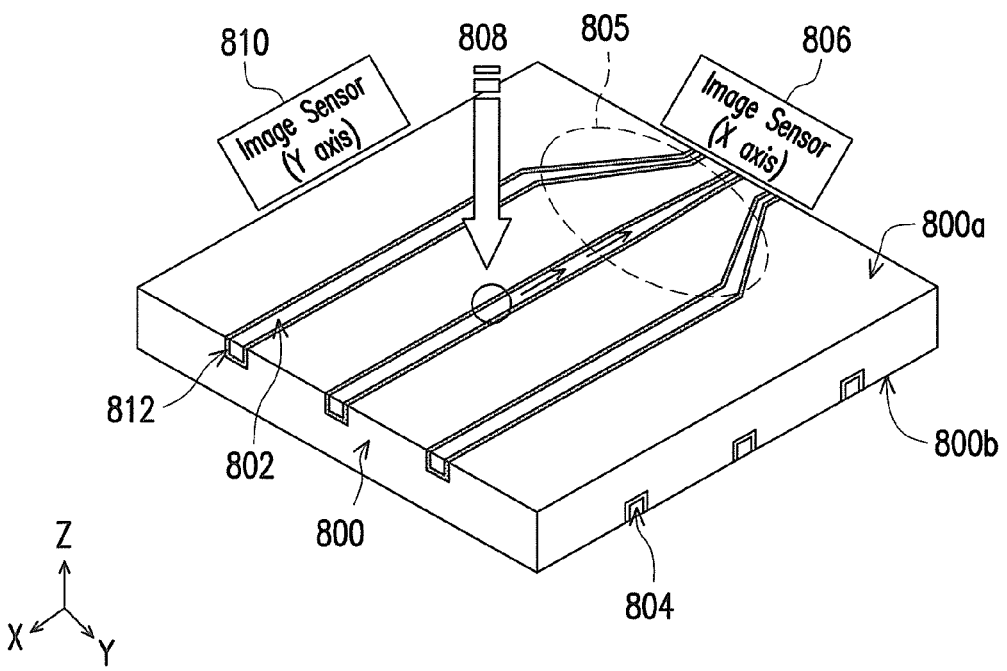

In FIG. 16, it is like the structure in FIG. 15. However, an additional thin file layer 812 also in low-n material between the high-n of the cladding layer 800 and the low-n of cores 802, 804 can be formed at the interface between the cores 802, 804 and the cladding layer 800. The quantity of n of the thin file layer 812 is between the cores 802, 804 and the cladding layer 800, so that the capability of light refraction in the cores can be improved. A material of the thin file layer 812 can be, for example, organic or inorganic, such as CNT or silica.

Figure 17:
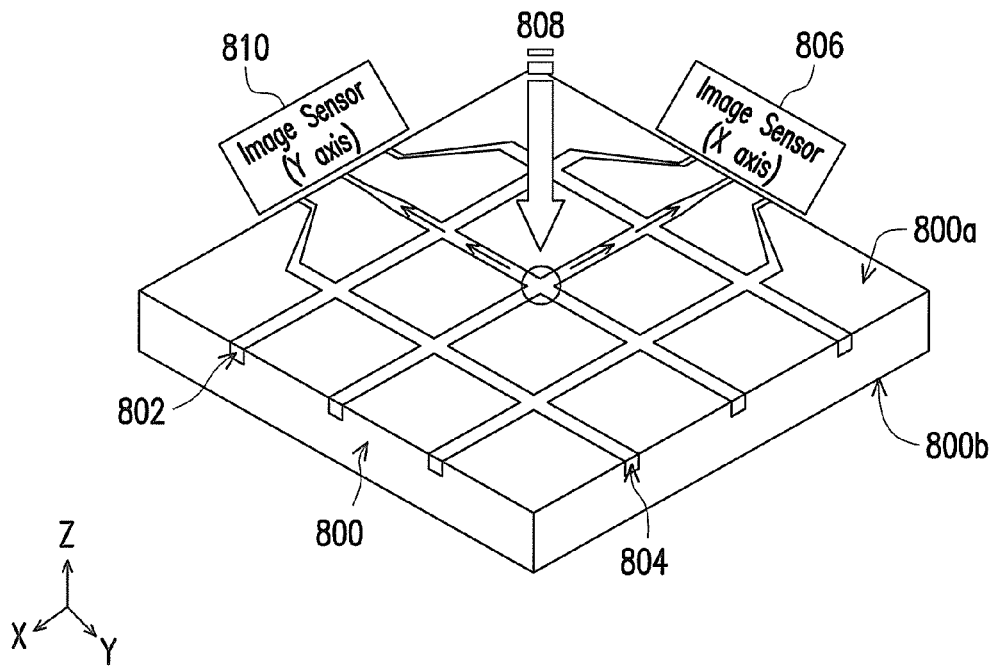

In FIG. 17, two waveguide arrays of the cores 802, 804 can be formed at the same surface of the cladding layer 800, such as at the surface 800a. In this structure, the cores 802 extending along the X-axis is intersecting with the cores 804 extending along the Y-axis. The light as shown in arrows can propagate in both directions.

Figure 18:
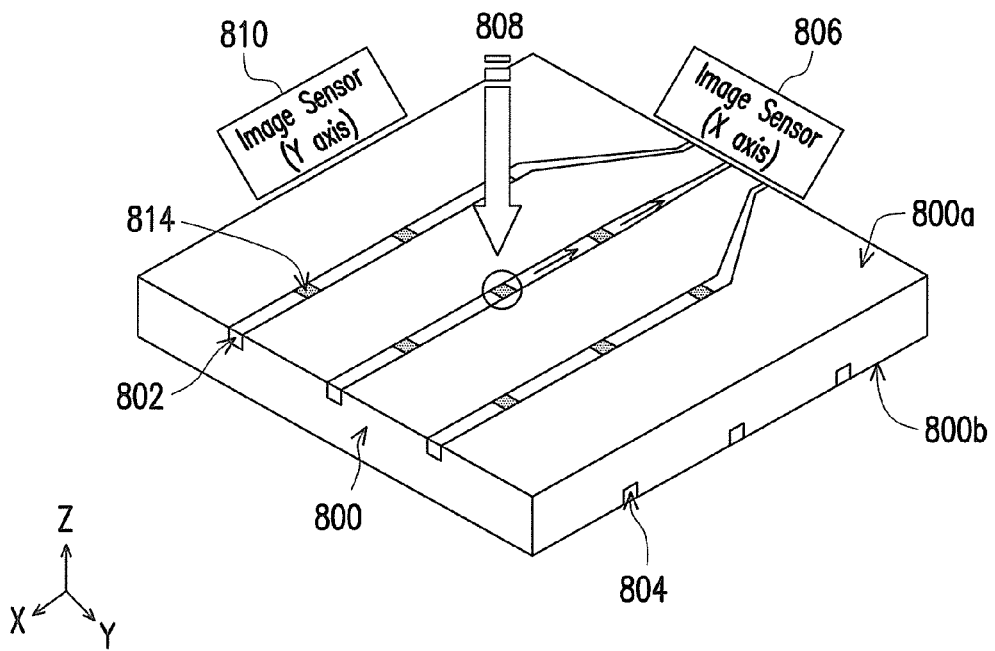

In FIG. 18, based on the structure in FIG. 15, in order to improve the light detection, the cores 802, 804 can be doped with optical dye at several local dye-doped regions 814. The dye-doped region 814 is also a high-n material, which can receive the incident light at a first wavelength. The light with the first wavelength then excites the doped dye and then generate a light with second wavelength. The light in second wavelength is guided within the cores 802, 804 to the image sensors 806, 810. The dye-doped regions 814 may be distributed in the cores 802, 804. Further for example, the dye-doped regions 814 can be formed at the overlapping region of the cores 802, 804 in two directions but not the only choice. The material for the dye-doped regions 814 can be, for example, fluorescent powder or other light-excited fluorescent materials without specific limitation.

Figure 19:
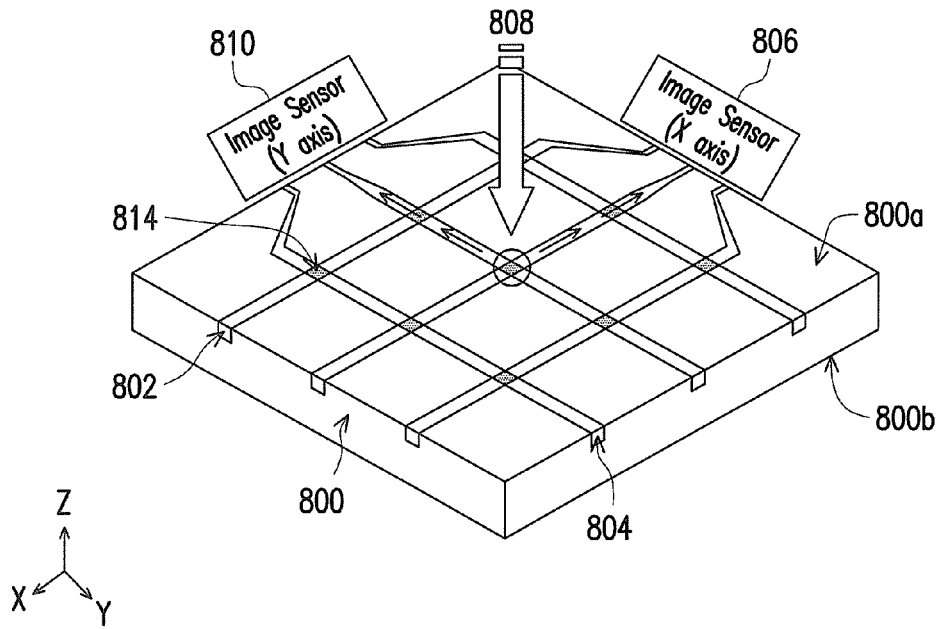

In FIG. 19, the two arrays of cores 806, 810 are formed in the cladding layer 800 at the same surface 800a. However, the dye-doped regions 814 are also formed in the cores 802, 804. For example, the dye-doped regions 814 can be formed the intersecting regions of cores 802, 804 in two directions.

In foregoing embodiments, the cores 802, 804 are formed on the cladding layer 800 with most of part being embedded in the cladding layer 800. The thin film layer and/or the dope-dye region can be incorporated into the cores 802, 804 at the same surface or different surface. However, the cores 802, 804 can also be formed on the cladding layer 800 by a protruding structure.

Figure 20:
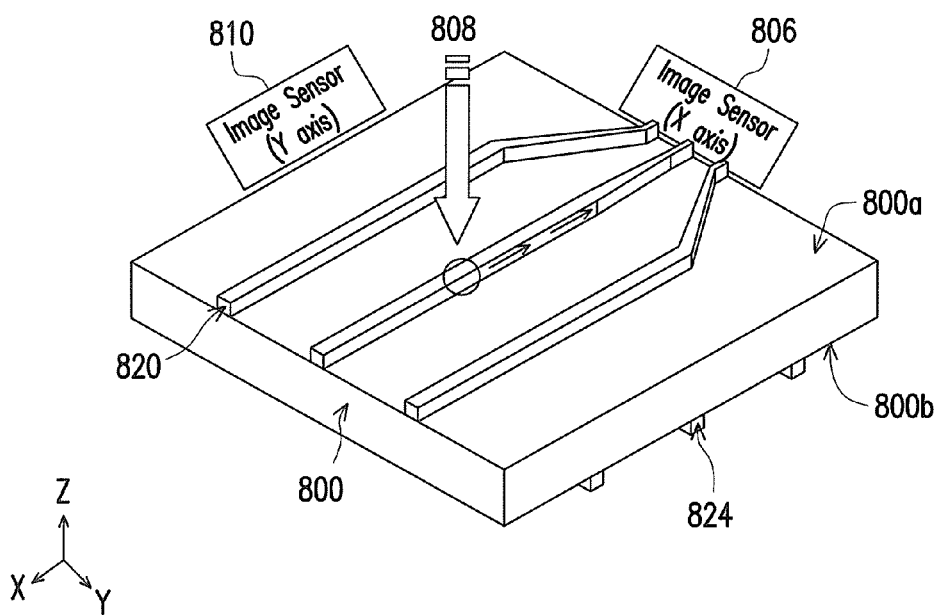

In FIG. 20, the concept remains the same but the cores 820, 824 are formed on the cladding layer 800 by the protruding structure. This may be formed by different fabrication process but still can be formed based on the conventional process. For example, the core material layer can be coating on the cladding layer 800 and is cured by UV. Then, the photolithographic and etching processes in semiconductor fabricating processes can be performed to pattern the core material layer. A surface portion of the cores 820, 824 are exposed to the air. Since the air is also the low-n material, like the cladding layer 800, the cores 802 can still function as the waveguide channel. The light can also propagate in the waveguide due to total internal reflection.

Figure 21:
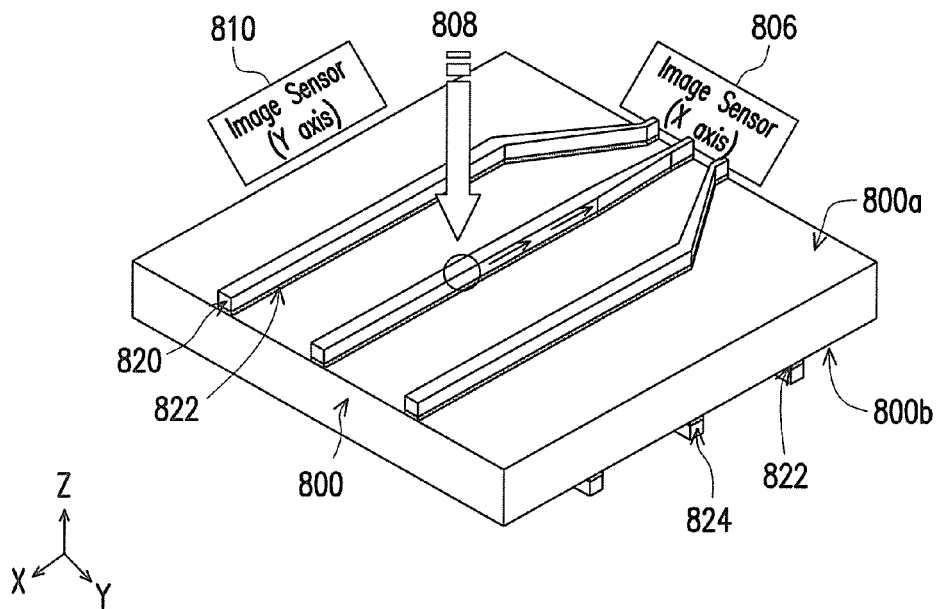

In FIG. 21, likewise, a thin film layer 822 can be formed between the cores 820, 824 and the cladding layer 800. In semiconductor fabrication, the thin film layer and the core material layer can be sequentially formed over the cladding layer and then are patterned into the waveguide channels.

Figure 22:
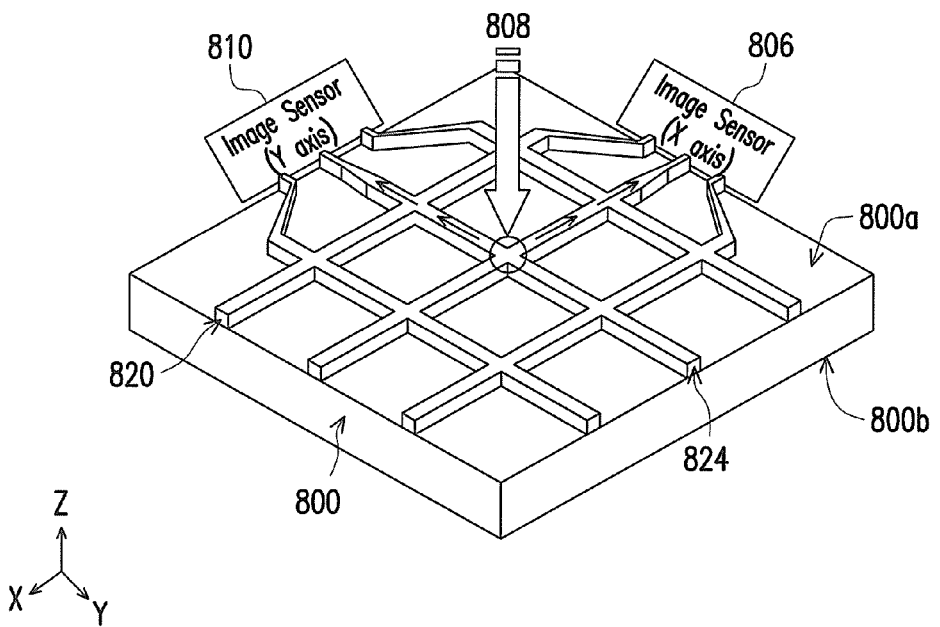

In FIG. 22, the cores 820, 824 are formed on the cladding layer 800 at the same surface, such as the surface 800a. In the example, the thin film layer 822 is not used.

Figure 23:
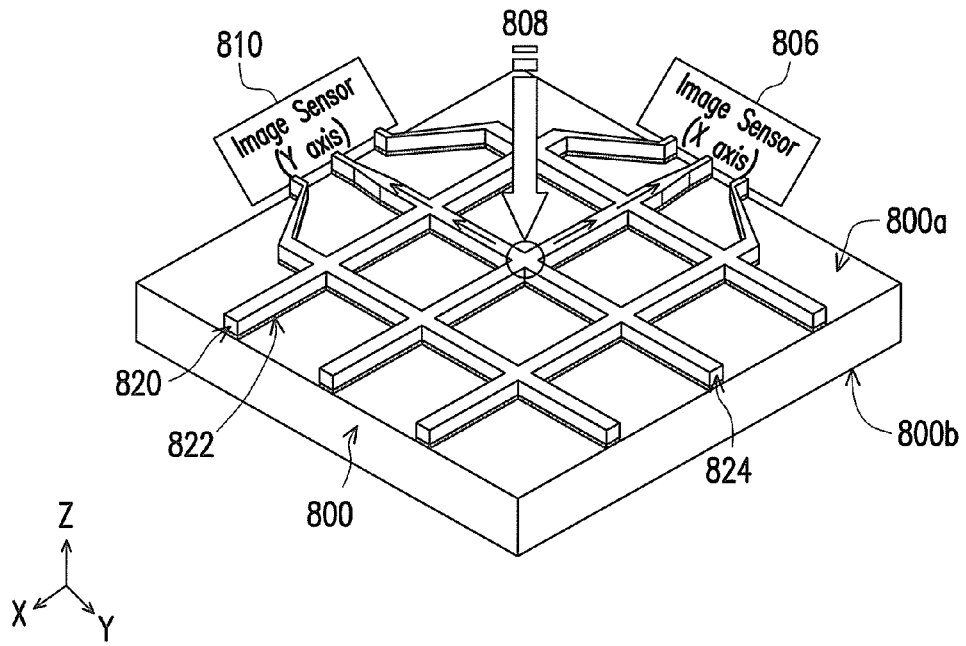

In FIG. 23, it is like the structure in FIG. 22 but the thin film layer 822 is included, for example.

Figure 24:
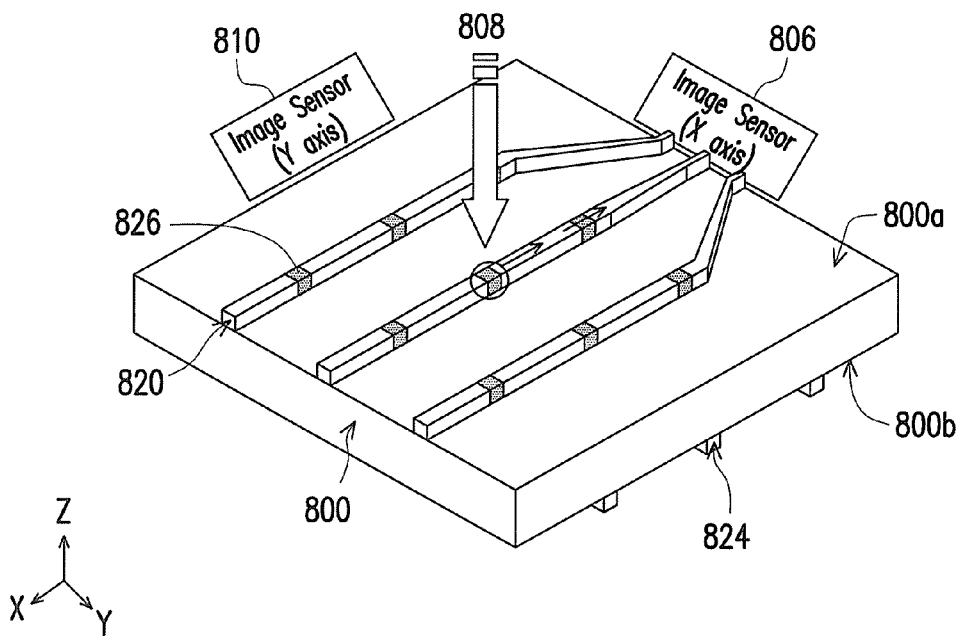

In FIG. 24, the doped-dye regions 826 are further formed in the cores 820, 824. The structure is based on the structure in FIG. 20.

Figure 25:
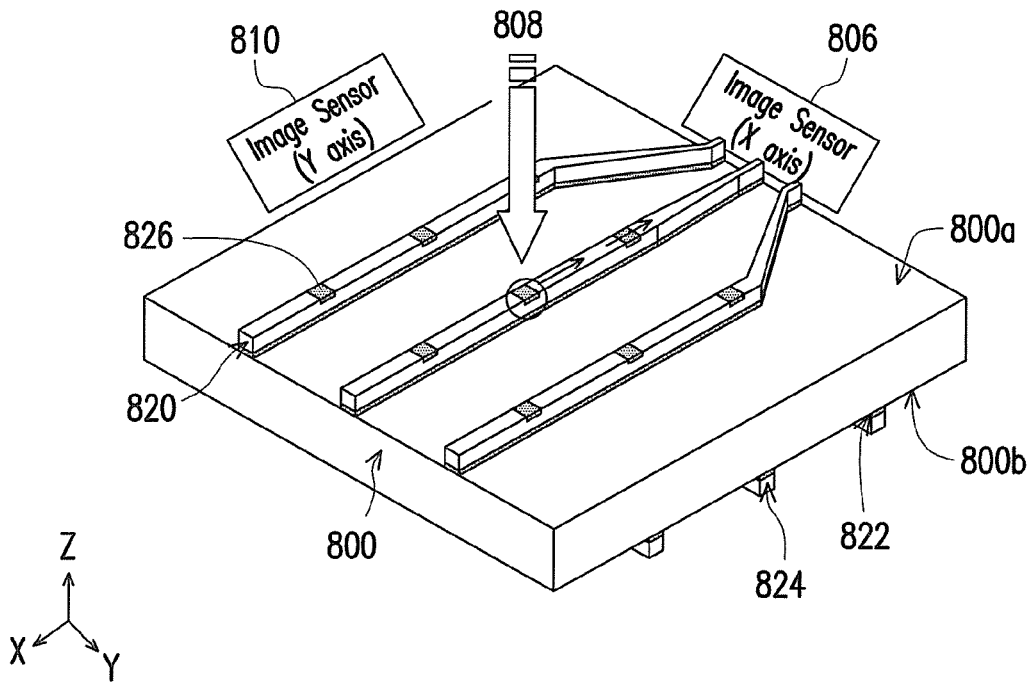

In FIG. 25, in addition to the structure in FIG. 24, both the doped-dye regions 826 and the thin film layer 822 can be implemented together.

Figure 26:
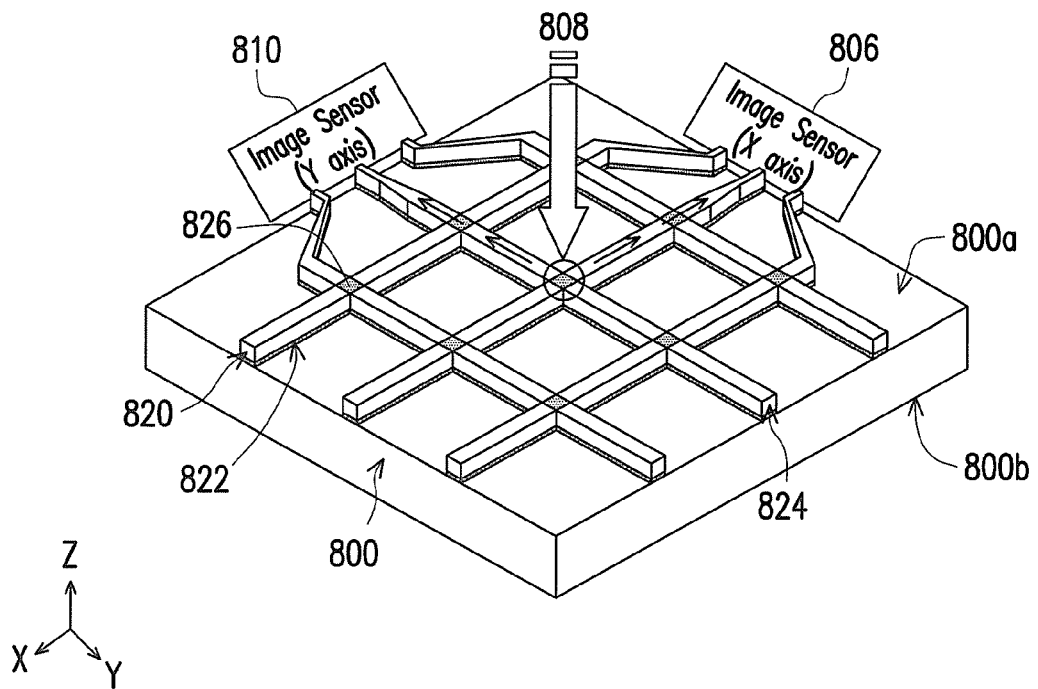

In FIG. 26, the cores 820, 824 are formed on the cladding layer 800 at the same surface 800a. In addition, the doped-dye regions 826 and the thin film layer 822 can be implemented together.

Figure 27:
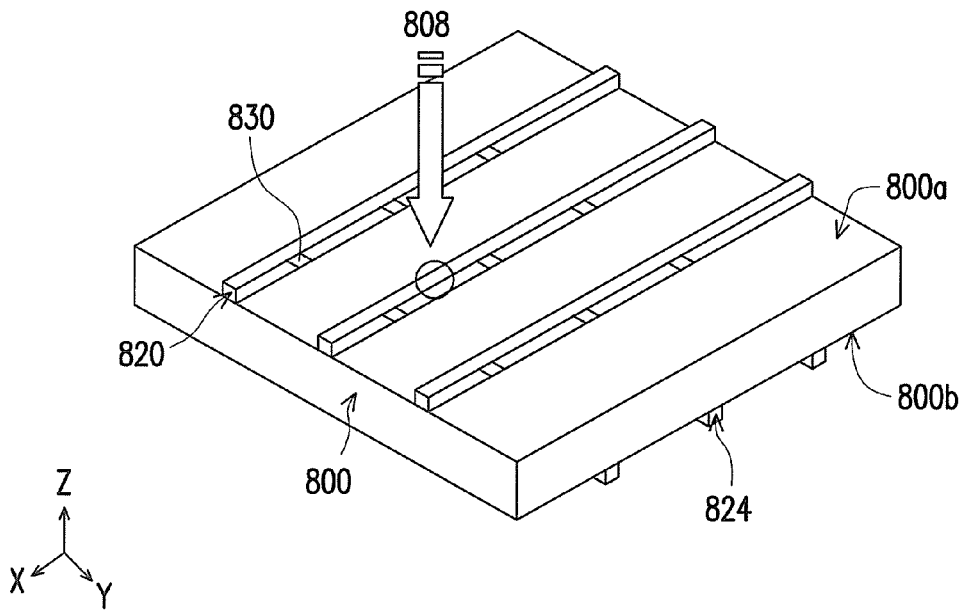

In FIG. 27, even further, based on the property of transparent conductive material in the art, the transparent conductive interconnection structure can also be formed in the cladding layer, such as at the region indicated by device region 830. As a result, the image sensor or any further optical device can be, for example, formed at the device region 830 or any other proper locations in accordance with the transparent conductive interconnection structure. In other words, the circuit in transparent conductive material can be also formed on the cladding layer 800. The image sensor for detecting the light signals can adapt to a proper location in more options in design.

Figure 28:
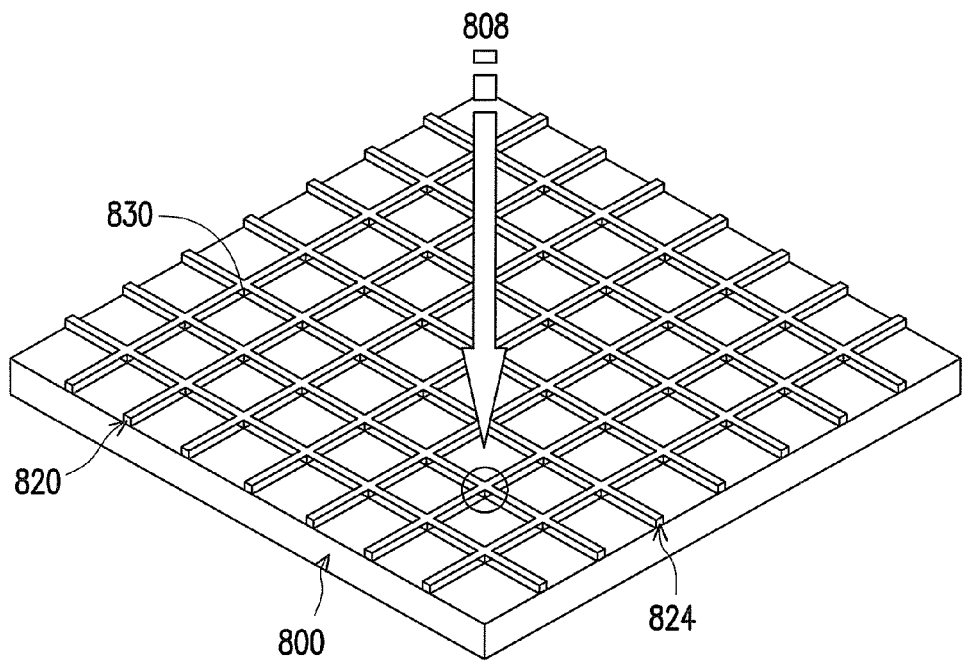

In FIG. 28, a single optical interactive panel may have it limitation of the available size in fabrication. However, if the screen size is larger than the size of a single optical interactive panel, several optical interactive panels can be assembled together into a large size. Particularly, when the transparent conductive interconnection structure is implemented, the image sensor can be more freely arranged, and then a large size of screen can be made.

Figure 29:
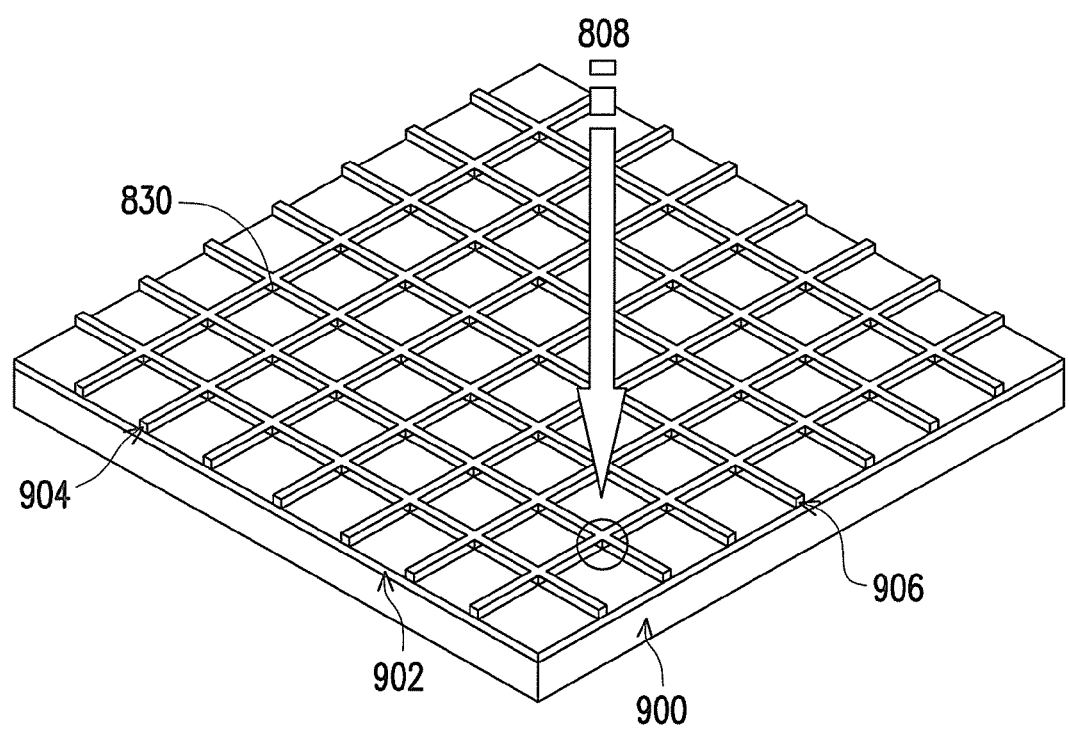

In FIG. 29, even further for example, the optical interactive panel can be fabricated by including an additional substrate 900 while the cladding layer 902 is formed on the substrate 900. In other words, the cladding layer is not serving as the mechanical base as a substrate. Then, the cores 904, 906 as previously described can be formed on the cladding layer 902. In this situation, preferably, the cores 904, 906 in two directions are formed at the same surface. The device region 830 may also be included to form the transparent conductive interconnection structure and any proper optical devices.

For the application on a display system, the display system can, for example, include an image display and an optical interactive panel. The optical interactive panel, as previously described, is formed on a screen of the image display to detect a relative location of a light spot on the screen. The image display receives the relative location of a light spot and responds a corresponding action.

It should be noted that the foregoing embodiments are just the examples for describing the disclosure and the disclosure is not just limited to the embodiments. Further, the embodiments to each other can also be properly combined into other embodiments.

The foregoing embodiments take IR light source as an example illustrating the incident light to be detected. In order to canalize the IR light and direct the same toward the corresponding optical sensors, waveguide channels are preferably embedded with inner canalizing structure, such as grating coupler or prism coupler. The inner canalizing structure with the optical functions of deflection and direction is advantageous in elevating the coupling efficiency and detecting sensitivity. It should be noted that the above-mentioned embodiments illustrate rather than limit the disclosure, and that those skilled in the art will be able to design many alternative embodiments without departing from the scope of the disclosure.

What is claimed is:

1. An optical interactive panel, comprising:
   a cladding layer, extended as an interactive plane, having a first index of refraction;
   a first waveguide array, having a plurality of first waveguide channels extending at a first direction and distributed in the cladding layer, wherein the first waveguide channels have a second index of refraction greater than the first index of refraction;
   a second waveguide array, having a plurality of second waveguide channels, extending at a second direction different from the first direction and distributed in the cladding layer, wherein when a light spot transversely transmits the first waveguide array and the second waveguide array, the first waveguide array and the second waveguide array receive the light spot and respectively guide a portion of the light spot as a first set of light signals and a second set of light signals;
   a first set of image sensor, detecting the first set of light signals from the first waveguide channels to determine a first-direction location; and
   a second set of image sensor, detecting the second set of light signals from the second waveguide channels to determine a second-direction location.

2. The optical interactive panel of claim 1, wherein the first direction crosses the second direction by a right angle.

3. The optical interactive panel of claim 1, wherein the first waveguide array and the second waveguide array are separately formed on different two surfaces of the cladding layer.

4. The optical interactive panel of claim 1, wherein the first waveguide array and the second waveguide array are same formed on the cladding layer at a same surface.

5. The optical interactive panel of claim 1, wherein the waveguide channels of the first waveguide array and the second waveguide array are embedded in the cladding layer, or protruding on the cladding layer.

6. The optical interactive panel of claim 1, wherein the waveguide channels of the first waveguide array and the second waveguide array are doped with an optical dye, wherein the optical dye receives a first wavelength incident light and generates a second wavelength light in cores of the waveguide channels.

7. The optical interactive panel of claim 6, wherein the optical dye in separate one of the waveguide channels is distributed in a plurality of doped regions.

8. The optical interactive panel of claim 1, further comprising a thin optical film layer at an interface between the cladding layer and the waveguide channels, the optical film layer having a third index of refraction between the first index of refraction and the second index of refraction.

9. The optical interactive panel of claim 1, each of cores of the waveguide channels has an internal structure for receiving an incident light and coupling at a portion light of the incident light into the cores.

10. The optical interactive panel of claim 1, wherein the cladding layer also serving as a mechanical substrate.

11. The optical interactive panel of claim 1, further comprising a substrate for adhering the cladding layer on the substrate.

12. The optical interactive panel of claim 1, further comprising a transparent conductive interconnection structure formed on the cladding layer, and the first set of image sensor and the second set of image sensor are distributed in accordance with locations of the transparent conductive interconnection structure.

13. An optical interactive apparatus, comprising:
   a plurality of optical interactive panels, assembled together side by side as a light spot sensing panel, wherein each of the optical interactive panels comprises:
   a cladding layer, extended as an interactive plane, having a first index of refraction;
   a first waveguide array, having a plurality of first waveguide channels extending at a first direction and distributed in the cladding layer, wherein the first waveguide channels have a second index of refraction greater than the first index of refraction;
   a second waveguide array, having a plurality of second waveguide channels, extending at a second direction different from the first direction and distributed in the cladding layer, wherein when a light spot transversely transmits the first waveguide array and the second waveguide array, the first waveguide array and the second waveguide array receive the light spot and respectively guide a portion of the light spot as a first set of light signals and a second set of light signals;
   a first set of image sensor, detecting the first set of light signals from the first waveguide channels to determine a first-direction location; and
   a second set of image sensor, detecting the second set of light signals from the second waveguide channels to determine a second-direction location.

14. A display system, comprising:
   an image display; and
   an optical interactive panel, formed on a screen of the image display to detect a relative location of a light spot on the screen, wherein the image display receives the relative location of a light spot and responds a corresponding action, wherein the optical interactive panel comprises:
   a cladding layer, extended as an interactive plane, having a first index of refraction;
   a first waveguide array, having a plurality of first waveguide channels extending at a first direction and distributed in the cladding layer, wherein the first waveguide channels have a second index of refraction greater than the first index of refraction;

a second waveguide array, having a plurality of second waveguide channels, extending at a second direction different from the first direction and distributed in the cladding layer, wherein when a light spot transversely transmits the first waveguide array and the second waveguide array, the first waveguide array and the second waveguide array receive the invisible light spot and respectively guide a portion of the light spot as a first set of light signals and a second set of light signals;

a first set of image sensor, detecting the first set of light signals from the first waveguide channels to determine a first-direction location of the relative location; and a second set of image sensor, detecting the second set of light signals from the second waveguide channels to determine a second-direction location of the relative location.

* * * * *